United States Patent
Johannes Kooijmans

(10) Patent No.: US 8,429,941 B2
(45) Date of Patent: Apr. 30, 2013

(54) LATCHING SYSTEM FOR A BICYCLE

(75) Inventor: Antonius Gerardus Petrus Johannes Kooijmans, Eindhoven (NL)

(73) Assignee: Call-Lock, BV, Veghel (NL)

( * ) Notice: Subject to any disclaimer, the term of this patent is extended or adjusted under 35 U.S.C. 154(b) by 0 days.

(21) Appl. No.: 13/388,003

(22) PCT Filed: Jul. 22, 2010

(86) PCT No.: PCT/NL2010/050470
§ 371 (c)(1),
(2), (4) Date: Mar. 6, 2012

(87) PCT Pub. No.: WO2011/014065
PCT Pub. Date: Feb. 3, 2011

(65) Prior Publication Data
US 2012/0192601 A1    Aug. 2, 2012

(30) Foreign Application Priority Data

Jul. 30, 2009    (NL) .................................... 1037162

(51) Int. Cl.
*B62H 5/00*    (2006.01)
(52) U.S. Cl.
USPC ............. 70/235; 70/388; 70/DIG. 17; 211/5; 211/20; 194/205; 414/227
(58) Field of Classification Search .................... 70/234, 70/235, 388, DIG. 17; 211/5, 20; 194/205; 414/227
See application file for complete search history.

(56) References Cited

U.S. PATENT DOCUMENTS

| | | | | |
|---|---|---|---|---|
| 581,499 | A * | 4/1897 | Wallingford | 194/212 |
| 608,186 | A * | 8/1898 | Doldt | 194/294 |
| 612,195 | A * | 10/1898 | Corwin | 194/250 |
| 1,065,858 | A * | 6/1913 | Williams | 211/9 |
| 1,093,817 | A * | 4/1914 | Williams | 70/421 |
| 1,408,295 | A * | 2/1922 | Hervey | 200/43.11 |
| 1,657,517 | A * | 1/1928 | Reason | 70/247 |
| 1,712,640 | A * | 5/1929 | Roehrich | 70/388 |
| 1,917,778 | A * | 7/1933 | Smith | 70/388 |
| 2,010,707 | A * | 8/1935 | Young | 70/235 |
| 3,019,634 | A * | 2/1962 | Roberson | 70/388 |
| 3,827,773 | A * | 8/1974 | Aiello | 312/100 |
| 4,433,787 | A * | 2/1984 | Cook et al. | 211/5 |
| 4,830,167 | A * | 5/1989 | Lassche | 194/247 |
| 5,917,407 | A * | 6/1999 | Squire et al. | 340/432 |
| 7,748,511 | B1 * | 7/2010 | Maher | 194/205 |
| 7,861,564 | B2 * | 1/2011 | Ito et al. | 70/252 |

(Continued)

*Primary Examiner* — Suzanne Barrett
(74) *Attorney, Agent, or Firm* — Eric Karich

(57) ABSTRACT

A latching system 1 has a housing 3 provided with a recess 5 in which a part of the bicycle can be inserted, preferably a frame tube sloping upwards. In the housing 3 a latching element 7 is located which can be moved between a release position in which the latching element opens the recess and a latching position in which the latching element closes the recess.

The latching system 1 further comprises a key 19 that is positioned in an opening 21 in the housing 3 and is pushed out of the housing when the latching element is moved from the latching position to the release position. To this end the latching element 7 is equipped with an arm 23 which is fitted to the U-shaped part of the housing. When the latching element 7 turns to the release position, one end 25 of the arm 23 pushes against the key 19 causing it it be pushed out of the opening 21.

3 Claims, 2 Drawing Sheets

U.S. PATENT DOCUMENTS

| | | | |
|---|---|---|---|
| 7,898,439 B2* | 3/2011 | Bettez et al. | 340/999 |
| 7,930,915 B2* | 4/2011 | Katagiri | 70/252 |
| 2008/0034820 A1* | 2/2008 | Gagosz et al. | 70/235 |
| 2011/0209508 A1* | 9/2011 | Andersen | 70/233 |
| 2012/0128453 A1* | 5/2012 | Lee et al. | 414/232 |
| 2012/0196631 A1* | 8/2012 | Fajstrup Axelsen | 455/466 |

* cited by examiner

LATCHING SYSTEM FOR A BICYCLE

FIELD OF THE INVENTION

The invention relates to a latching system comprising a housing provided with a recess in which a part of the bicycle can be inserted, which latching system comprises a latching element that can be shifted between a release position in which the latching element opens the recess and a latching position in which the latching element closes the recess and latches a bicycle part that is present in the recess.

STATE OF THE ART

A latching system of this type is generally known. For the latching element in the known latching system to be shifted to the release position a key is to be inserted. If the known latching system is used in a bicycle storage facility and is present in a stationary column, the key stays behind in the latching system after the bicycle has been removed from the latching system. The bicycle is provided with a bicycle lock and can be locked with a further key elsewhere during use. Consequently, as a disadvantage always two keys are required.

SUMMARY OF THE INVENTION

It is an object of the invention to improve the provision of a latching system of the type defined in the opening paragraph with which, when used in a bicycle storage facility, the disadvantage mentioned earlier does not occur. To this end the latching system according to the invention is characterised in that the latching system also comprises a key that is accommodated in an opening in the housing and is pushed out of the housing through the opening when the latching element is moved from the latching position to the release position. By providing the bicycle with a bicycle lock that can be operated with the same key, only one key is needed for locking the bicycle in a bicycle storage facility and elsewhere. For this purpose care should then be taken that the bicycle can only be removed from the latching system of the bicycle storage facility after the user has first identified himself or herself so as to avoid unauthorized persons collecting the bicycle.

An embodiment of the latching system according to the invention is characterised in that the latching element is pivotable around a shaft inside the housing and is provided with an arm that pushes the key outwards when the latching element is turned to the release position. This provides in a simple way that the key is automatically pushed out of the latching system.

A further embodiment of the latching system according to the invention is characterised in that the shape of the latching element is such that when a bicycle part present in the recess is pulled away from the recess, this part turns the latching element into the release position. In consequence, the latching element need not manually be turned to the release position or the latching system need not be provided with a mechanism for doing this automatically.

Still a further embodiment of the latching system according to the invention is characterised in that the key is provided with a chip and the latching system is provided with a reader for reading the information stored on the chip. This provides a simple identification option of the key, so that it is possible to register automatically the duration of use of a bicycle. Preferably also the bicycle is provided with a chip and the latching system accommodates a further reader for reading the information from this chip. This also creates the possibility of identifying the bicycle too, thus thwarting the possibility of the user returning a bicycle that is different from the rented bicycle after the period of rent has expired. The chip is preferably positioned inside or on top of the bicycle part that is inserted into the recess of the latching system and the further reader is preferably positioned in or behind the partition wall of the recess.

BRIEF DESCRIPTION OF THE DRAWINGS

The invention will be described below in more detail based on an example of embodiment of the latching system according to the invention represented in the drawing figures, in which.

DETAILED DESCRIPTION OF THE DRAWINGS

Figure 1:
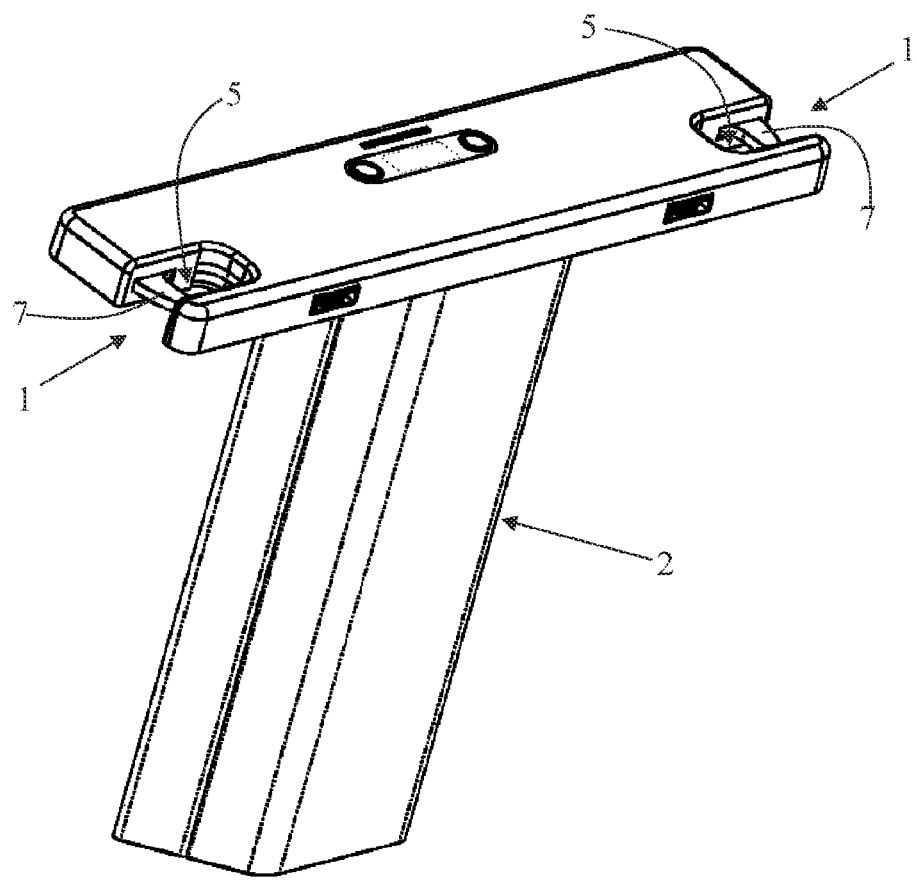
FIG. 1 shows a column provided with two latching systems according to the invention.
Figure 2:
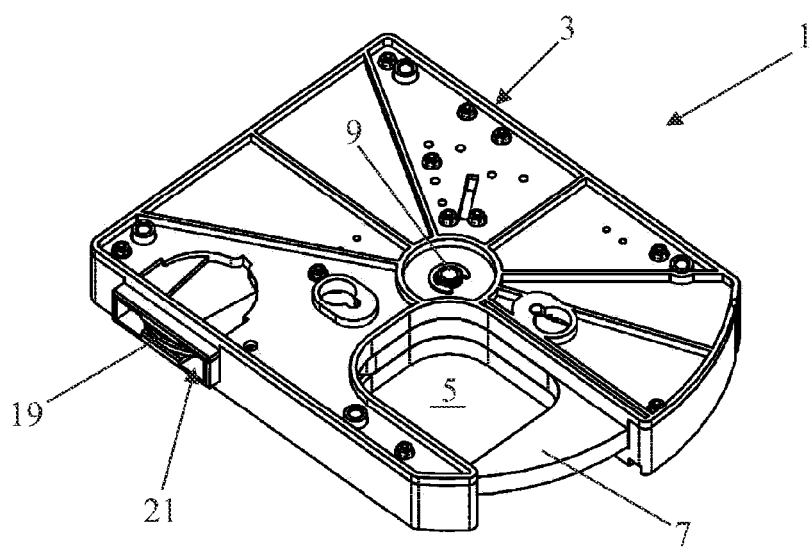
FIG. 2 shows a separate latching system taken from the column.

FIG. 1 shows a column 2 which is provided with two latching systems 1 for latching a bicycle. FIG. 2 gives a separate view of one of the latching systems 1. The latching system 1 comprises a housing 3 that has a recess 5 in which a part of the bicycle, preferably a frame tube sloping upwards, can be inserted. The housing 3 accommodates a latching element 7 which is pivitable around a shaft 9 and movable between a release position in which the latching element opens the recess (see FIG. 4), and a latching position in which the latching element closes the recess (see FIGS. 2 and 3).

Figure 3:
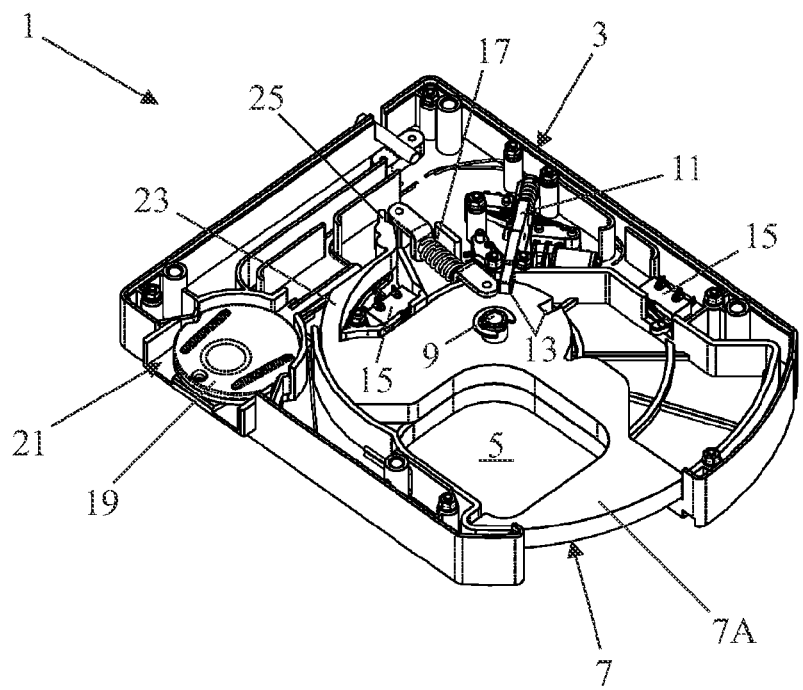
FIG. 3 shows a cut-away view of the latching system with the latching element in latching position.
Figure 4:
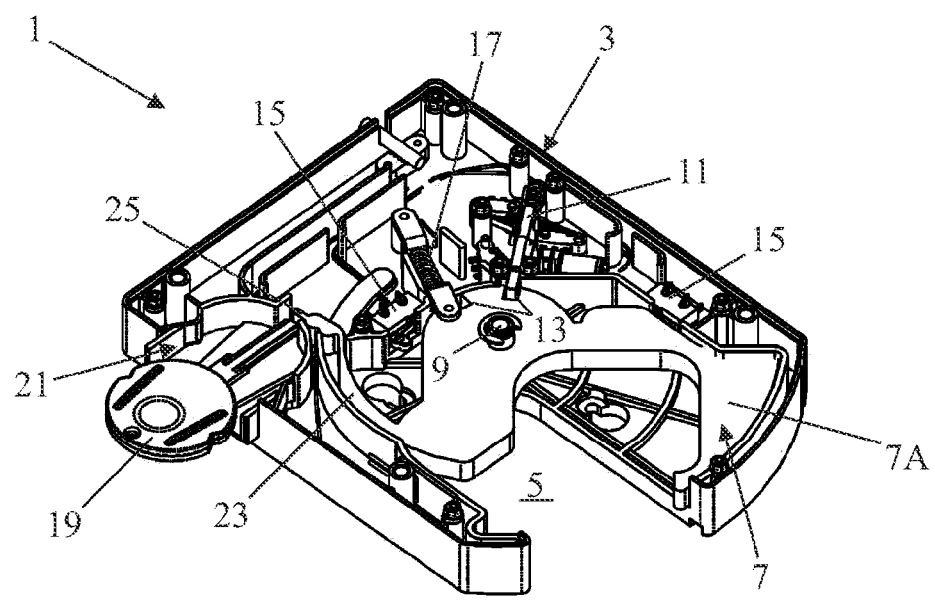
FIG. 4 shows a cut-away view of the latching system with the latching element in release position.

In FIGS. 3 and 4 the latching system 1 is shown with an open housing. In the two extreme positions (release position and latching position) the latching element 7 is blocked by a catch 11 that can be inserted into recesses 13 by an electromotor (not shown), which recesses are located in the latching element. The electromotor is activated after the latching element 7 in one of the extreme positions has pushed against a switch 15. A pressure spring 17 provides that the latching element 7 is always pushed into either extreme position.

The latching element 7 has a U-shaped part and at one of the corners is pivitable around the shaft 9. By pulling out a bicycle part that has been inserted into the recess 5, this part pushes against the part 7A of the latching element 7, so that the latter turns to the release position. Once the latching element 7 has turned through a certain angle, the pressure spring 17 will further turn the latching element to the release position.

The latching system 1 further comprises a key 19 that is positioned in an opening 21 in the housing 3 and is pushed out of the housing through the opening when the latching element is moved from the latching position to the release position. For this purpose the latching element 7 is provided with an arm 23 which is attached to one end of the U-shaped part. When the latching element 7 turns to the release position, an end 25 of the arm 23 pushes against the key 19 causing it to be pushed through the opening 21.

The key 19 is provided with a chip (not shown) and the latching system is provided with a reader (not shown either) for reading the information available on the chip. As a result, the key can be identified in a simple manner making it possible to record automatically for how long a bicycle has been used.

Albeit the invention has been described in the foregoing based on the drawing figures, it should be observed that the invention is not by any manner or means restricted to the embodiment shown in the drawing figures. The invention also extends to all embodiments deviating from the embodiment shown in the drawing figures within the spirit and scope defined by the claims.

What is claimed is:

1. A latching system comprising:
  a housing provided with a recess in which a part of a bicycle can be inserted;
  a latching element that can be shifted between a release position in which the latching element opens the recess and a latching position in which the latching element closes the recess and latches the part of the bicycle that is present in the recess; and
  a key that is accommodated in an opening in the housing and is pushed out of the housing through the opening when the latching element is moved from the latching position to the release position; and
  wherein the latching element is pivotable around a shaft inside the housing and is provided with an arm that pushes the key outwards when the latching element is turned to the release position.

2. A latching system as claimed in claim 1, characterised in that the shape of the latching element is such that when the part of the bicycle present in the recess is pulled away from the recess, the part of the bicycle turns the latching element to the release position.

3. A latching system as claimed in claim 1 or 2, characterised in that the key is provided with a chip and the latching system is provided with a reader for reading the information stored on the chip.

* * * * *